US007962954B2

(12) United States Patent
Zavalkovsky et al.

(10) Patent No.: US 7,962,954 B2
(45) Date of Patent: Jun. 14, 2011

(54) AUTHENTICATING MULTIPLE NETWORK ELEMENTS THAT ACCESS A NETWORK THROUGH A SINGLE NETWORK SWITCH PORT

(75) Inventors: Arthur Zavalkovsky, Netanya (IL); John Zamick, Somerset (GB); Yoram Ramberg, Herzliya (IL)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 11/962,069

(22) Filed: Dec. 20, 2007

(65) Prior Publication Data
US 2008/0092214 A1 Apr. 17, 2008

Related U.S. Application Data

(63) Continuation of application No. 10/346,052, filed on Jan. 15, 2003, now abandoned.

(51) Int. Cl.
*G06F 7/04* (2006.01)
*G06F 15/16* (2006.01)
*G06F 17/30* (2006.01)
*H04L 29/06* (2006.01)
(52) U.S. Cl. .......................................................... 726/4
(58) Field of Classification Search .................. 726/4
See application file for complete search history.

(56) References Cited

U.S. PATENT DOCUMENTS

| | | | |
|---|---|---|---|
| 5,805,801 A * | 9/1998 | Holloway et al. | 726/22 |
| 5,983,360 A | 11/1999 | Ugajin | |
| 7,222,360 B1 * | 5/2007 | Miller | 726/3 |
| 7,325,246 B1 * | 1/2008 | Halasz et al. | 726/2 |
| 2002/0051450 A1 * | 5/2002 | Ganesh et al. | 370/389 |
| 2002/0129276 A1 | 9/2002 | Watts | |

OTHER PUBLICATIONS

Blunk, L., et al., "PPP Extensible Authentication Protocol (EAP)," Network Working Group, Request for Comments: 2284, Mar. 1998, http://www.ietf.or/rfc/rfc2284.txt?number=2284, printed Apr. 16, 2003 pp. 1-15.
Andersson, H., et al., "Protected EAP Protocol (PEAP)," PPTEXT Working Group, http://www.globecom.net/ietf/draft/draft-josefsson-pppext-eap-tls-eap-02.html, printed Apr. 16, 2003, pp. 1-43.
Congdon, Paul, "Port Based Network Login—EAP Over Ethernet Overview", IEEE Plenary, Montreal, Jul. 1999, www.ieee802.org/1/files/public/docs1999/eapoeov.pdf, 12 pages.

* cited by examiner

*Primary Examiner* — Jason K Gee
(74) *Attorney, Agent, or Firm* — Hickman Palermo Truong & Becker LLP

(57) ABSTRACT

A method is disclosed for authenticating multiple network elements that access a network through a single network switch port. Certain authentication protocols, such as EAPoE, leave a port of a network switch indefinitely opened when one particular host is authenticated and authorized to transmit network frames through the port. In one embodiment of the invention, a network frame from a second host that is received by the open port is not automatically transmitted to the network. Instead, techniques are employed locally by the network switch to grant or deny transmission of the network frame received from the second host. An authentication server is contacted only when the network switch cannot locally employ techniques to authorize the transmission of the network frame received from the second host.

40 Claims, 7 Drawing Sheets

AUTHENTICATING MULTIPLE NETWORK ELEMENTS THAT ACCESS A NETWORK THROUGH A SINGLE NETWORK SWITCH PORT

This application is a continuation of prior application Ser. No. 10/346,052, filed Jan. 15, 2003 now abandoned, the contents of which is incorporated by reference as if fully set forth herein.

FIELD OF THE INVENTION

The present invention generally relates to computer network security. The invention relates more specifically to a method and apparatus for authenticating multiple network elements that access a network through a single network switch port.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A computer network typically includes multiple network elements. These network elements may include hosts, such as personal computers and workstations, and devices that manage network traffic from the hosts, such as hubs and switches. Hubs and switches have ports to which other network elements may connect. For example, a first host may be connected to a first port of a switch at the same time that a second host connects to a second port of the switch. The switch may be connected to other network elements within the network. The first host and the second host may access the other network elements through the switch.

Security is an important consideration when networking one or more network elements together. If a network is not secure, then an unauthorized device may be able to access and even modify private information that is stored on other network elements that are connected to the network. For example, in an insecure network environment, a user might connect an unauthorized laptop computer to a port of a network switch and thereby gain access to information and resources that the user has no permission to access.

To increase network security, authentication protocols have been implemented in some network switches. One popular authentication protocol is Extensible Authentication Protocol (EAP). EAP is defined in IETF Request for Comments (RFC) 2284. EAP is an extension to Point-to-Point Protocol (PPP) that is used to connect a host to a network. When EAP is used in conjunction with the Ethernet protocol, it is commonly referred to as EAP over Ethernet (EAPoE). Cisco Catalyst series switches, from Cisco Systems, Inc., support EAPoE.

When a host initially attempts to access a network through a port of a switch that supports EAPoE, the switch requests information from the host that will allow the switch to determine whether to grant access to the host. Based on a response from the host, the switch may or may not grant the host access to the network. According to at least one implementation of EAPoE, once a switch has granted access to a host on a particular port, the port remains "open" thereafter. That is, once a switch has granted access to a host on a particular port, the switch does not thereafter request information, through that port, that the switch would use to determine whether to grant access to the host that is connected to that port.

For switches that are configured to allow only one host to be connected to a given port of a switch, the above implementation may be sufficiently secure. However, because the number of ports on a switch is limited, it is often desirable for more than one host to access a network through a given port of a switch. For example, a hub may be connected to a particular port of a switch. Multiple hosts may be connected to the hub. The hub receives network traffic from each of the hosts and broadcasts that network traffic to the particular port of the switch.

For another example, a wireless Local Area Network (LAN) station may be connected to a particular port of a switch. Multiple hosts may communicate with the wireless LAN station. The wireless LAN station receives network traffic from each of the hosts and transmits that network traffic to the particular port of the switch. Thus, multiple hosts may seek access to a network through a single port of a switch.

When a switch allows multiple hosts to seek network access through a single port, EAPoE may provide insufficient security. After such a switch authenticates a first host that attempts to access a network through a particular port of the switch, the switch will not thereafter attempt to authenticate any other host that attempts to access the network through the particular port. All attempted connections through an open port would be allowed. As a result, unauthorized network elements may obtain network access through the particular port.

Because EAPoE is a widely known and accepted standard, and because so many existing switches and client programs implement the EAPoE protocol in the manner described above, replacing existing switches and programs with switches and programs that use an authentication protocol other than EAPoE is not ideal or economical. Some devices and programs support authentication schemes such as Lightweight EAP (LEAP) protocol, Protected EAP (PEAP) protocol, or Microsoft Challenge Authentication Protocol (MSCHAP), but many do not.

Although some switches may be configured to allow only one host to connect to a network through a single switch port, it is advantageous to allow multiple hosts to connect to a network through a single switch port so that fewer total switch ports (and therefore fewer switches) are needed. Many legacy networks implement multiple hosts per switch port. When adopting the IEEE 802.1x standard, users of legacy networks are forced to either forego the security benefits of 802.1x port security, or upgrade their entire infrastructure to permit only a single host per port. The former option fails to provide adequate security, and the latter option is usually not economically viable. Furthermore, configuring a switch to allow only one host to connect to a network through a single switch port prevents multiple hosts from accessing a network through a single wireless LAN station.

Based on the foregoing, there is a clear need for a way to authenticate multiple network elements that access a network through a single network switch port.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for authenticating multiple network elements that access a network through a single network switch port is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Authenticating Multiple Network Elements that Access a Network through a Single Network Switch Port
   3.1 Process of Associating a MAC Address with a Timestamp
   3.2 Process of Purging a MAC Address Table
   3.3 Process of Re-authenticating a MAC Address Table
4.0 Implementation Mechanisms—Hardware Overview
5.0 Extensions and Alternatives 1.0 General Overview The needs identified in the foregoing Background, and other needs and objects that will become apparent from the following description, are achieved in the present invention, which comprises, in one aspect, a method for authenticating multiple network elements that access a network through a single network switch port. A network frame is received on a port of a network switch. A unique identifier of a network element, such as a Media Access Control (MAC) address, is determined from the network frame. It is determined whether the MAC address is contained in a MAC address table that is associated with the port.

If the MAC address is contained in the MAC address table, then an action that is associated with the MAC address is determined from the MAC address table. If the MAC address is associated with a first action (e.g., a "PERMIT" action), then the frame is allowed to be transmitted. If the MAC address is associated with a second action (e.g., a "DENY" action), then the frame is prevented from being transmitted.

Alternatively, if the MAC address is not contained in the MAC address table, then a server is asked whether the MAC address is authorized. In other words, an authentication action is performed. An indication whether the MAC address is authorized is received from the server in response. In other words, either a positive or a negative response from an authentication agent (e.g., an Authentication, Authorization, and Accounting (AAA) server) is yielded by the authentication action. If the MAC address is authorized, then an association between the MAC address and the first action (e.g., a "PERMIT" action) is added to the MAC address table. In other words, if the MAC address is authorized, then an authentication action result for the MAC address is recoded to allow the host that is identified by the MAC address to access network resources through the port. If the MAC address is not authorized, then an association between the MAC address and the second action (e.g., a "DENY" action) is added to the MAC address table. In other words, if the MAC address is not authorized, then an authentication action result for the MAC address is recoded to prevent the host that is identified by the MAC address from accessing network resources through the port.

In other aspects, the invention encompasses a computer apparatus, and a computer readable medium, configured to carry out the foregoing steps. Alternative embodiments may use network element identifiers other than MAC addresses, as long as the identifier ("authentication key") is readily extractable from the frame arriving at the switch port.

2.0 Structural and Functional Overview

Figure 1:
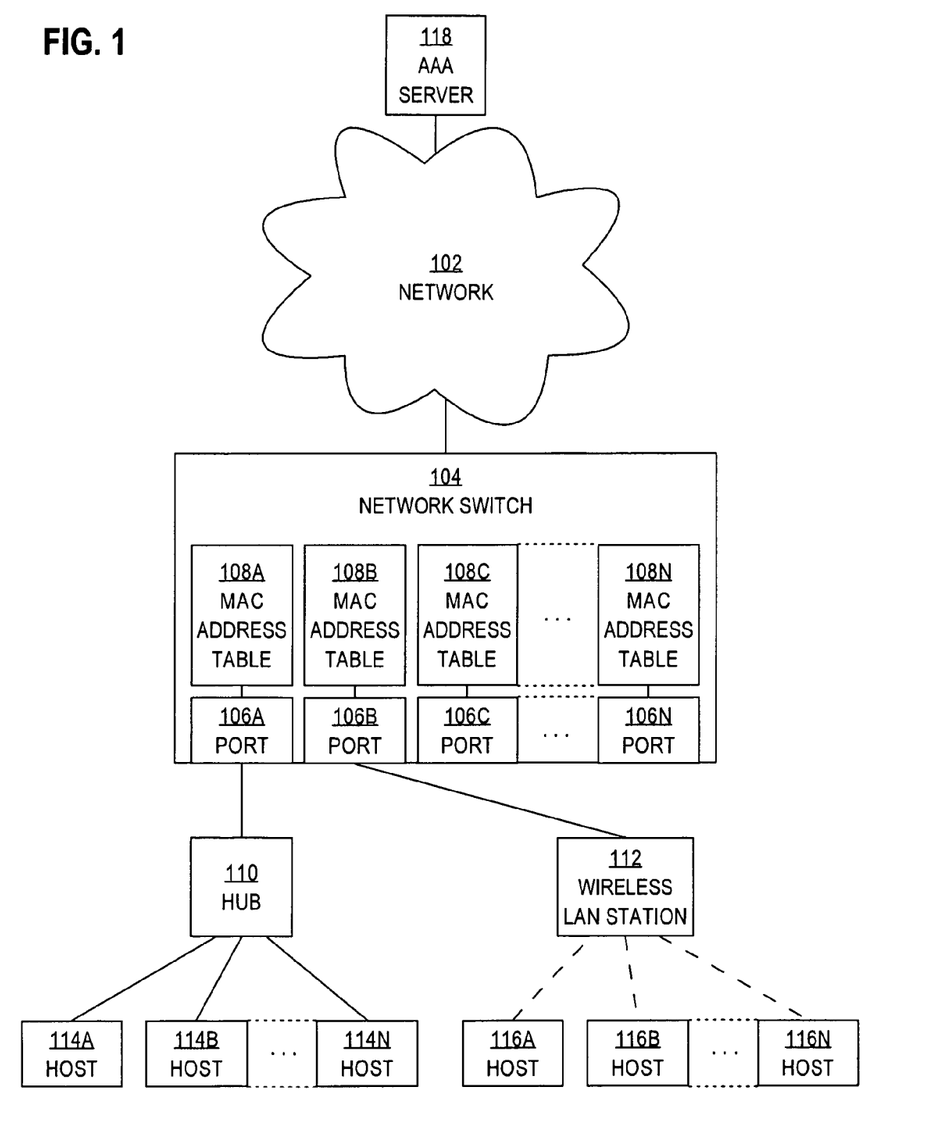
FIG. 1 is a block diagram that illustrates an overview of a system that may be used to practice a method for authenticating multiple network elements that access a network through a single network switch port.

FIG. 1 is a block diagram that illustrates an overview of a system that may be used to practice a method for authenticating multiple network elements that access a network through a single network switch port. The system comprises a network 102, a network switch 104, a hub 110, and wireless LAN station 112, hosts 114A-114N, hosts 116A-116N, and an AAA server 118. Network switch 104 has ports 106A-106N. Network switch 104 also stores MAC address tables 108A-108N. For example, network switch 104 may store MAC address tables 108A-108N in one or more Random Access Memory (RAM) modules.

Network switch 104, hub 110, wireless LAN station 112, hosts 114A-114N, hosts 116A-116N, and AAA server 118 are all network elements. Network elements are routers, switches, hubs, gateways, personal computers, workstations, and other devices that are or can be connected to or communicate with a network. According to one embodiment, such network elements are devices that are authenticated before they are allowed to access a network. The system shown is just one of many possible different configurations. Other embodiments may include fewer or more network elements than those illustrated.

Network switch 104 is communicatively coupled to network 102. AAA server 118 is also communicatively coupled to network 102. Hub 110 is communicatively coupled to port 106A. Hosts 114A-114N are communicatively coupled to port 106A. Thus, hosts 114A-14N communicate with network 102 through port 106A of network switch 104. Network traffic may flow from network switch 104 to hosts 114A-114N as well as from hosts 114A-114N to network switch 104. Wireless LAN station 112 is communicatively coupled to port 106B. Hosts 116A-116N, while not physically connected to wireless LAN station 112, are configured to communicate with wireless LAN station 112 through unguided media such as electromagnetic waves. For example, hosts 116A-116N may be configured to send signals to and receive signals from wireless LAN station 112 via infrared or visible light, microwaves, or radio waves. Network traffic may flow from wireless LAN station 112 to hosts 116A-116N as well as from hosts 116A-116N to wireless LAN station 112. The description herein is not meant to imply that network traffic is unidirectional.

Network elements may be communicatively coupled to various other network elements through one or more ports that may be included in those components. While numerous network elements are illustrated separately from network 102, from one perspective, all of the network elements illustrated may be considered to comprise a network. Network 102 may be a local area network (LAN) or a wide area network (WAN).

Hosts 114A-114N and 116A-116N may be computers such as personal computers and workstations. Hosts 114A-14N and 116A-16N may be network elements such as routers and switches. Each of hosts 114A-114N and 116A-116N may contain a network interface device such as a network interface card. A network interface device is capable of transmitting network frames (e.g., data packets) to and receiving network frames from a network.

Hub 110 is configured to receive network frames from hosts 114A-14N and transmit those network frames to port 106A of network switch 104. Wireless LAN station 112 is configured to receive network frames from hosts 116A-116N and transmit those network frames to port 106B of network switch 104. Network switch 104 is configured to receive network frames through ports 106A-106N, determine network addresses for which the network frames are destined, and forward the network frames to devices that are associated with the destined network addresses.

In one embodiment, each of ports 106A-106N is uniquely associated with one of MAC address tables 108A-108N. Each of MAC address tables 108A-108N contains one or more rows. Each row contains a MAC address and a state indicator that is associated with the MAC address. The state indicator may also be referred to as an "action". In one embodiment, the state indicator may contain the value "PERMIT" or the value "DENY". While in one embodiment each of ports 106A-106N is associated with a separate MAC address table, in an alternative embodiment, some or all of the ports are associated with the one, global MAC address table. Although embodiments are described herein with use of MAC addresses, any other functionally equivalent unique identifier of a network element that is known or later developed may be used, provided that the chosen identifier ("authentication key") can be extracted from the Ethernet frame.

Network switch 104 is configured to receive a network frame on one of ports 106A-106N. Network switch 104 is configured to determine a MAC address from the frame. Network switch 104 is configured to determine whether the MAC address is contained in the particular one of MAC address tables 108A-108N that is associated with the one of ports 106A-106N upon which the frame was received.

Network switch 104 is configured to determine, from the one of MAC address tables 108A-108N, an action or state indicator that is associated with the MAC address if the MAC address is contained in the particular one of the MAC address tables. Network switch 104 is configured to transmit the frame to network 102 if the MAC address is associated with a "PERMIT" action in the particular one of MAC address tables 108A-108N. Network switch 104 is configured to prevent transmission of the frame to network 102 if the MAC address is associated with a "DENY" action in the particular one of MAC address tables 108A-108N. Network switch 104 is configured to maintain the particular one of the MAC address tables 108A-108N in its current state if the MAC address is contained in the particular one of the MAC address tables.

Network switch 104 is configured to ask AAA server 118 (e.g., by sending a query through network 102) whether the MAC address is authorized if the MAC address is not contained in the particular one of MAC address tables 108A-108N. Network switch 104 is configured to receive an indication, from AAA server 118 and in response to asking the AAA server, an indication whether the MAC address is authorized if the MAC address is not contained in the particular one of MAC address tables 108A-108N. In one embodiment, network switch 104 is configured to add, to the particular one of MAC address tables 108A-108N, an association between the MAC address and either a "PERMIT" action or a "DENY" action; a "PERMIT" action if the MAC address is authorized, and a "DENY" action if the MAC address is not authorized.

In one embodiment, network switch 104 is configured to perform the operations described above for every network frame that is received on any of ports 106A-106N. In one embodiment, network switch 104 is configured to use unmodified EAPoE as an authentication protocol, in conjunction with the enhancements described above. In one embodiment, network switch 104 is not configured to use LEAP, PEAP, or MSCHAP.

AAA servers are typically configured to provide authentication, authorization, and accounting services. Authentication is the process of determining that a user or network element is what it purports to be, usually based on a username and password or other identifier(s). Authorization is the process of granting or denying a user or network element access to network resources once the user or network element has been authenticated. A user or network element may be associated with an authorization level that indicates the amount of information and network resources that the user or network element may access. Accounting is the process of recording information about activities of a user or network element on a network. A Remote Authentication Dial-In User Service (RADIUS) server is one kind of AAA server; Terminal Access Controller Access Control System Plus (TACACS+) is also used.

AAA server 118 is configured to receive a MAC address from network switch 104. AAA server 118 is configured to indicate to network switch 104 whether a MAC address that the AAA server received from the network switch is authorized to communicate with network 102. AAA server 118 may store a set of authorized MAC addresses. A network administrator may provide a set of authorized MAC addresses to AAA server 118. AAA server 118 may store one set of MAC addresses that are associated with a "PERMIT" action, and another set of MAC addresses that are associated with a "DENY" action. Viewed from one perspective, each of MAC address tables 108A-108N is configured to cache a subset of the information that is stored by AAA server 118. AAA server 118 may be configured to determine whether a particular MAC address is authorized to communicate with network 102 based on a variety of specified criteria (e.g., on which port the MAC address was received, on which switch the MAC address was received, etc.).

In one embodiment, network switch 104 is configured to periodically remove old entries from MAC address tables 108A-108N. In one embodiment, network switch 104 is configured to periodically re-authenticate entries in MAC address tables 108A-108N.

Figure 2A:
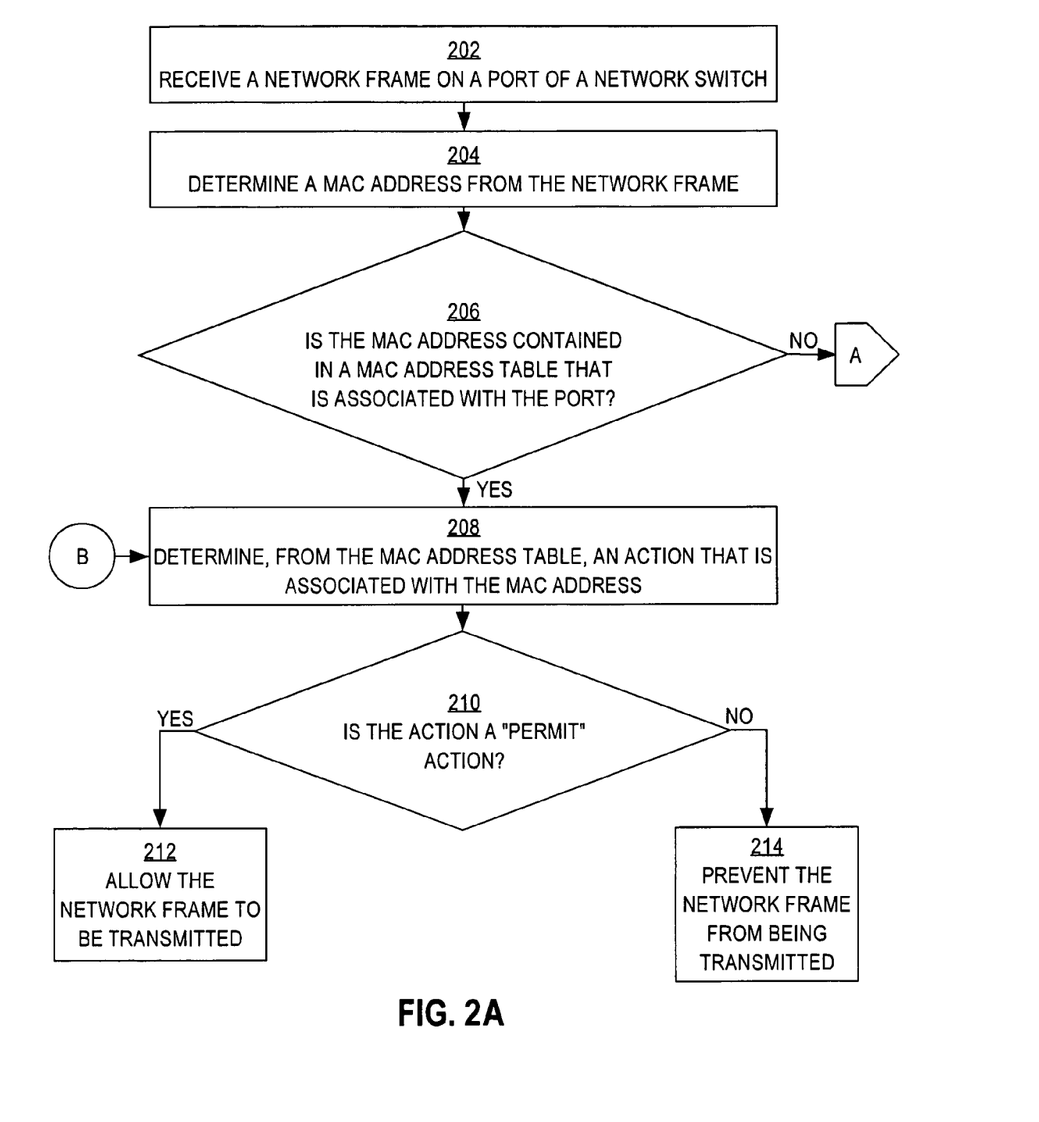
FIGS. 2A and 2B are flow diagrams that illustrate a high level overview of one embodiment of a method for authenticating multiple network elements that access a network through a single network switch port.
Figure 2B:
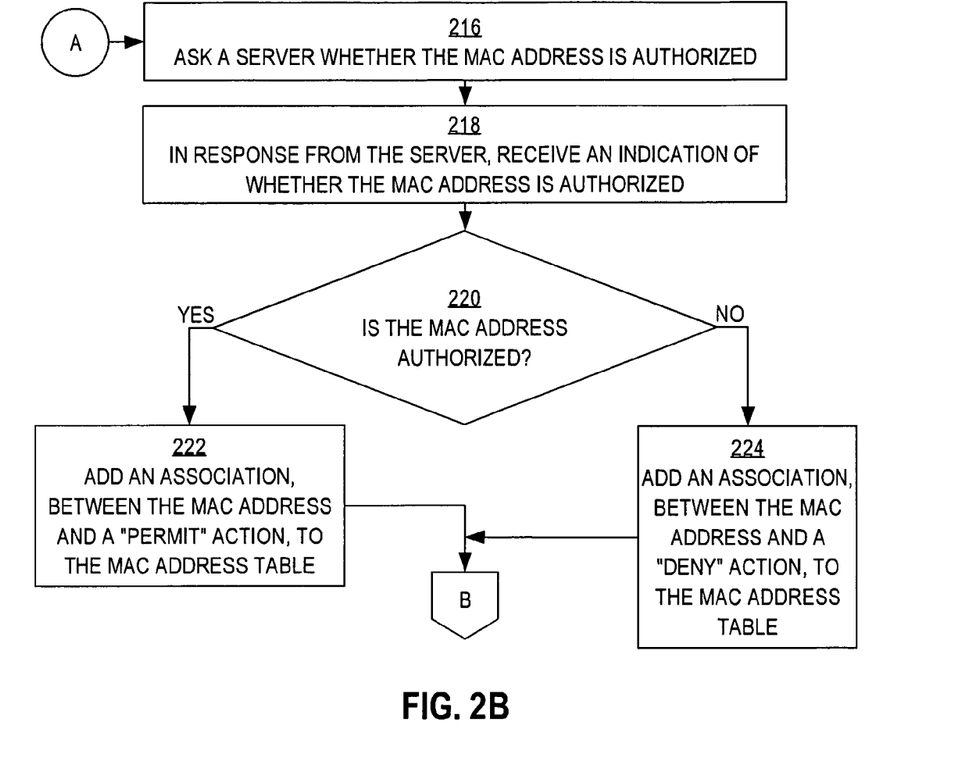

3.0 Method of Authenticating Multiple Network Elements that Access a Network Through a Single Network Switch Port FIGS. 2A and 2B are flow diagrams that illustrate a high level overview of one embodiment of a method for authenticating multiple network elements that access a network through a single network switch port. In one embodiment, the following method is performed for every network frame that is received on any switch port through which multiple network elements may attempt to access a network.

Referring to FIG. 2A, in block 202, a network frame is received on a port of a network switch. For example, network switch 104 may receive a network frame on port 106A.

In block 204, a MAC address is determined from the network frame. For example, network switch 104 may determine a MAC address from the network frame. Embodiments may use a MAC address or any other functionally equivalent identifier of a network element, provided that the chosen identifier ("authentication key") can be extracted from the Ethernet frame.

In block 206, it is determined whether the MAC address is contained in a MAC address table (e.g., MAC address table 108A) that is associated with the port. For example, network switch 104 may determine whether the MAC address is contained in MAC address table 108A, which is associated with port 106A. If it is determined that the MAC address is contained in the MAC address table, then control passes to block 208. If it is determined that the MAC address is not contained in the MAC address table, then control passes to block 216 of FIG. 2B.

In block 208, it is determined, from the MAC address table, an action that is associated with the MAC address. For example, network switch 104 may determine, from MAC address table 108A, an action that is associated with the MAC address. In one embodiment, an association, between the MAC address and a time at which the network frame was received, is added to the MAC address table before control passes to block 210.

In block 210, it is determined whether the action is a "PERMIT" action. For example, network switch 104 may determine whether the action is a "PERMIT" action or a "DENY" action. If the action is a "PERMIT" action, then control passes to block 212. If the action is not a "PERMIT" action (e.g., the action is a "DENY" action), then control passes to block 214. In one embodiment, an association, between the MAC address and a time at which the network frame was received, is added to the MAC address table before control passes to block 212 or block 214.

In block 212, the network frame is allowed to be transmitted. For example, network switch 104 may transmit the network frame to network 102. MAC address table 108A is maintained in its current state.

In block 214, the network frame is prevented from being transmitted. For example, network switch 104 may prevent the network frame from being transmitted to network 102. MAC address table 108A is maintained in its current state.

Referring to FIG. 2B, in block 216, a server is asked whether the MAC address is authorized. For example, network switch 104 may ask AAA server 118 whether the MAC address is authorized.

In block 218, an indication is received, in response, from the server. The indication indicates whether the MAC address is authorized. For example, network switch 104 may receive, in response to asking AAA server 118 whether the MAC address is authorized, an indication from the AAA server as to whether the MAC address is authorized.

In block 220, based on the indication that was received from the server, it is determined whether the MAC address is authorized. For example, network switch 104 may determine, from an indication that was received from AAA server 118, whether the MAC address is authorized. If the MAC address is authorized, then control passes to block 222. If the MAC address is not authorized, then control passes to block 224.

In block 222, an association between the MAC address and a "PERMIT" action is added to the MAC address table. For example, network switch 104 may add a row to MAC address table 108A that associates the MAC address with a "PERMIT" action. Thereafter, control passes back to block 208. The network frame is allowed to be transmitted.

In block 224, an association between the MAC address and a "DENY" action is added to the MAC address table. For example, network switch 104 may add a row to MAC address table 108A that associates the MAC address with a "DENY" action. Thereafter, control passes back to block 208. The network frame is prevented from being transmitted.

To illustrate the use of the method described with reference to FIGS. 2A and 2B, an example is provided below. In the example, wireless LAN station 112, which was previously not connected to network switch 104, is connected to port 106B of network switch 104. Thereafter, host 116A transmits a network frame to wireless LAN station 112. Wireless LAN station 112 automatically transmits the network frame to port 106B of network switch 104.

Network switch 104 determines that the network frame is destined for a network element that is connected to network 102. Because this is the first network frame that network switch 104 has received on port 106B, network switch 104 uses the unmodified EAPoE protocol to authenticate host 116A. Upon authenticating host 116A, network switch 104 opens port 106B according to the unmodified EAPoE protocol.

Network switch 104 examines MAC address table 108B and does not find the MAC address that the network frame indicates (i.e., the MAC address of host 116A). Therefore, network switch 104 asks AAA server 118 whether the MAC address is authorized. AAA server 118 determines that the MAC address is authorized. AAA server 118 responds to network switch 104 that the MAC address is authorized. Upon being notified that the MAC address is authorized, network switch 104 adds a row to MAC address table 108B. The row indicates an association between the MAC address and a "PERMIT" action. Network switch 104 transmits the network frame to network 102.

Thereafter, host 116A transmits another network frame to wireless LAN station 112. Wireless LAN station 112 automatically transmits the network frame to port 106B of network switch 104. Because network switch 104 has already opened port 106B in accordance with the unmodified EAPoE protocol, the network switch does not use the EAPoE protocol to authenticate host 116A again.

Network switch 104 determines that the network frame is destined for a network element that is connected to network 102. Network switch 104 examines MAC address table 108B and finds the MAC address that the network frame indicates (i.e., the MAC address of host 116A). Because the MAC address is already stored in MAC address table 108B, network switch 104 does not need to ask AAA server 118 whether the MAC address is authorized again. Network switch 104 determines that the MAC address is associated with a "PERMIT" action in MAC address table 108B. Consequently, network switch 104 transmits the network frame to network 102.

Thereafter, host 116B transmits a network frame to wireless LAN station 112. In this example, host 116B is an unauthorized network element whose MAC address is not authorized according to AAA server 118. Wireless LAN station 112 automatically transmits the network frame to port 106B of network switch 104. Because network switch 104 has already opened port 106B in accordance with the unmodified EAPoE protocol, the network switch does not use the EAPoE protocol to authenticate host 116B. If not for the method described above with reference to FIGS. 2A and 2B, network switch 104 would transmit the network frame to network 102, thereby failing to prevent a breach of network security.

However, in this example, network switch 104 examines MAC address table 108B and does not find the MAC address that the network frame indicates (i.e., the MAC address of host 116B). Therefore, network switch 104 asks AAA server 118 whether the MAC address is authorized. AAA server 118 determines that the MAC address is not authorized. AAA server 118 responds to network switch 104 that the MAC address is not authorized. Upon being notified that the MAC address is not authorized, network switch 104 adds a row to MAC address table 108B. The row indicates an association between the MAC address and a "DENY" action. Network switch 104 prevents the network frame from being transmitted to network 102.

Thereafter, host 116B transmits another network frame to wireless LAN station 112. Wireless LAN station 112 automatically transmits the network frame to port 106B of network switch 104. Because network switch 104 has already opened port 106B in accordance with the unmodified EAPoE protocol, the network switch does not use the EAPoE protocol to authenticate host 116B.

Network switch 104 determines that the network frame is destined for a network element that is connected to network 102. Network switch 104 examines MAC address table 108B and finds the MAC address that the network frame indicates (i.e., the MAC address of host 116B). Because the MAC address is already stored in MAC address table 108B, network switch 104 does not need to ask AAA server 118 whether the MAC address is authorized again. Network switch 104 determines that the MAC address is associated with a "DENY" action in MAC address table 108B. Consequently, network switch 104 prevents the network frame from being transmitted to network 102.

3.1 Process of Associating a MAC Address with a Timestamp

Figure 3:
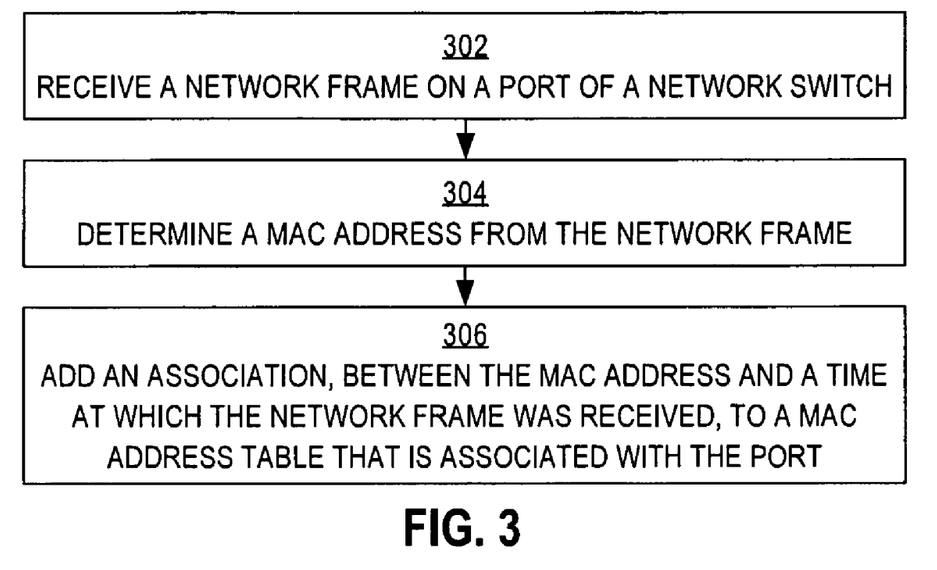
FIG. 3 is a flow diagram that illustrates one embodiment of a process for associating a media access control (MAC) address with a timestamp.

To enable the determination of whether the information in a MAC address table is current, it is beneficial to maintain a record of how long it has been since a particular MAC address transmitted a network frame. FIG. 3 is a flow diagram that illustrates one embodiment of a process for associating a MAC address with a timestamp.

In block 302, a network frame is received on a port of a network switch. For example, network switch 104 may receive a network frame on port 106A.

In block 304, a MAC address is determined from the network frame. For example, network switch 104 may determine a MAC address from the network frame.

In block 306, an association, between the MAC address and a time at which the network frame was received, is added to a MAC address table (e.g., MAC address table 108A) that is associated with the port. For example, network switch 104 may record the current time in a timestamp field of a row of MAC address table 108A that contains the MAC address. The timestamp is reset regardless of the authentication state of the entry in the MAC address table so that both authenticated and unauthenticated entries may be purged according to the process described in the section below. If the MAC address is not contained in the MAC address table, then the MAC address (and an associated action) may be added to the MAC address table in accordance with the method illustrated above with reference to FIGS. 2A and 2B.

3.2 Process of Purging a MAC Address Table

In order to maintain the MAC address tables at a reasonable size, stale entries are periodically purged from the MAC address tables.

Figure 4A:
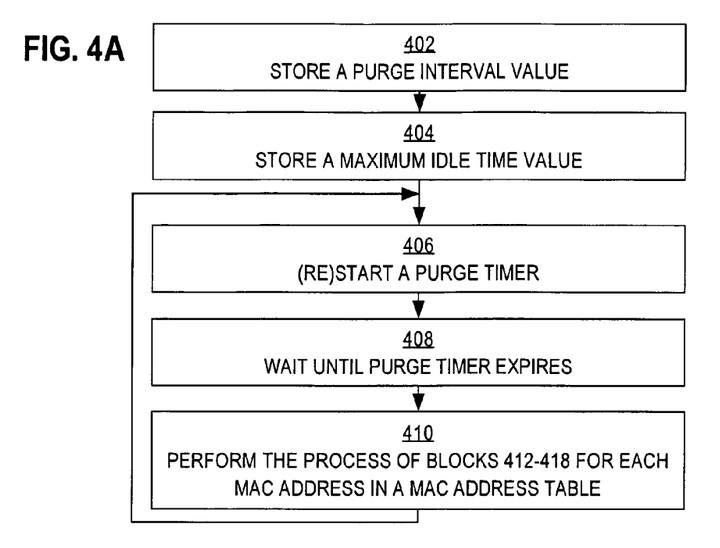
FIGS. 4A and 4B are flow diagrams that illustrate one embodiment of a process for purging a MAC address table.
Figure 4B:
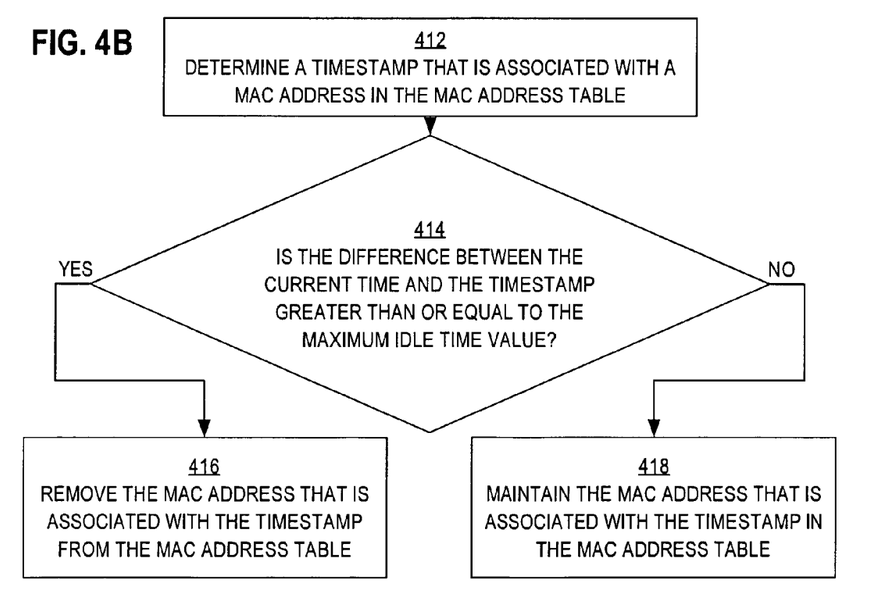

FIGS. 4A and 4B are flow diagrams that illustrate one embodiment of a process for purging a MAC address table. The process illustrated below with reference to FIGS. 4A and 4B may be performed concurrently with other processes described herein. For example, a processor within network switch 104 may execute multiple different processes concurrently.

In block 402, a purge interval value is stored. For example, a network administrator could cause network switch 104 to store a purge interval value. Thus, in one embodiment, network switch 104 is configured to store a purge interval value. The purge interval value may be a configurable global parameter.

In block 404, a maximum idle time value is stored. For example, a network administrator could cause network switch 104 to store a maximum idle time value. The maximum idle time value is the longest period of time that may pass without a port receiving a network frame from a particular MAC address before a network element that has that MAC address is no longer authenticated on (i.e., logically "disconnected" from) that port. The maximum idle time value may be a configurable global parameter.

In block 406, a purge timer is started, or restarted if it has already expired. For example, network switch 104 may start a purge timer. In block 408, the process waits until the purge timer has expired. The purge timer expires when the purge timer value is greater than or equal to the purge interval value.

In block 410, the process that is illustrated in blocks 412-418 is performed for each MAC address in a MAC address table (e.g., MAC address table 108A). For example, network switch 104 may perform the process that is illustrated in blocks 412-418 for each MAC address that is in MAC address table 108A. Then control passes back to block 406.

In block 412, a timestamp that is associated with the MAC address in the MAC address table is determined. For example, network switch 104 may perform this determination.

In block 414, it is determined whether the difference between the current time and the time indicated by the timestamp is greater than or equal to the maximum idle time value. For example, network switch 104 may determine if the difference between the current time and the time indicated by the timestamp is greater than or equal to the maximum idle time value. If the difference is greater than or equal to the maximum idle time value, then control passes to block 416. If the difference is less than the maximum idle time value, then control passes to block 418.

In block 416, the MAC address that is associated with the timestamp is removed from the MAC address table. For example, network switch 104 may remove the particular MAC address that is associated with the timestamp from MAC address table 108A. Network switch 104 no longer considers the network element that has the particular MAC address to be authenticated on port 106A (which is associated with MAC address table 108A). Network switch 104 will query AAA server 118, as described above with reference to FIGS. 2A and 2B, the next time that the network switch receives a network frame that has the particular MAC address on port 106A.

In block 418, the MAC address that is associated with the timestamp is maintained in the MAC address table. For example, network switch 104 may maintain the particular MAC address that is associated with the timestamp in MAC address table 108A.

The process that is illustrated in blocks 412-418 may be performed for each MAC address that is stored in any of the MAC address tables that are stored on a particular network switch. Once the process that is illustrated in blocks 412-418 has been performed for each MAC address, control may pass back to block 406, wherein the purge timer may be restarted.

3.3 Process of Re-Authenticating a MAC Address Table

Figure 5A:
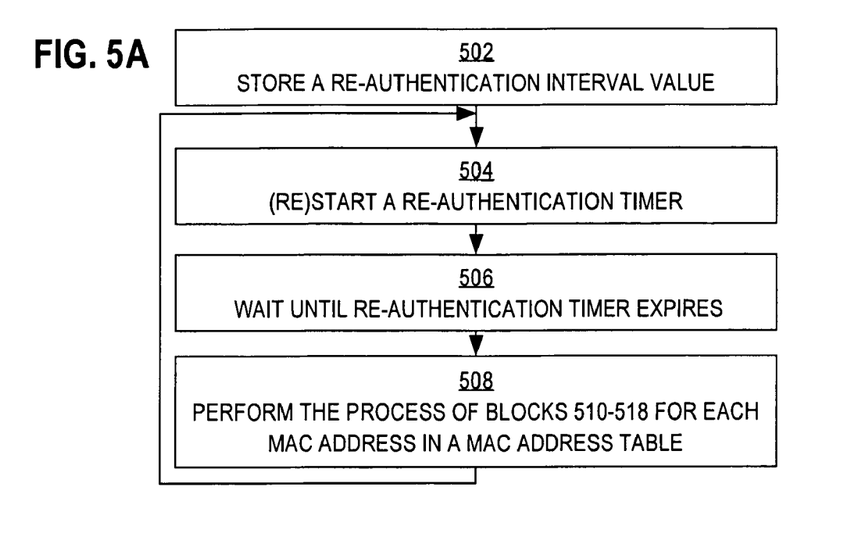
FIGS. 5A and 5B are flow diagrams that illustrate one embodiment of a process for re-authenticating a MAC address table.
Figure 5B:
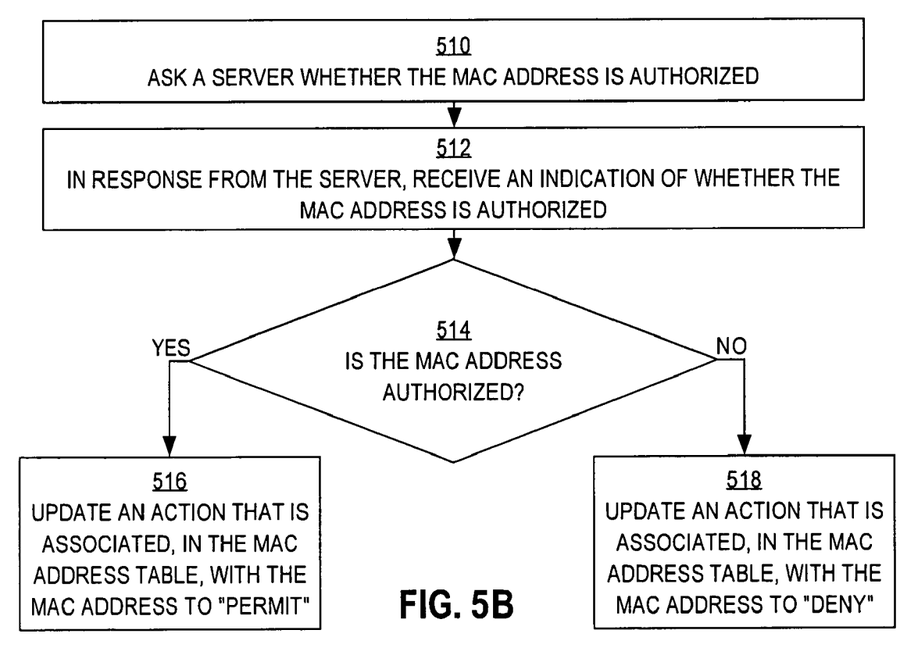

FIGS. 5A and 5B are flow diagrams that illustrate one embodiment of a process for re-authenticating a MAC address table. Through this process, each MAC address table that is stored by a network switch may be periodically updated to reflect current information that is stored by an AAA server. The process illustrated below with reference to FIG. 5 may be performed concurrently with other processes described herein. For example, a processor within network switch 104 may execute multiple different processes concurrently.

In block 502, a re-authentication interval value is stored. For example, a network administrator could cause network switch 104 to store a re-authentication interval value. Thus, in one embodiment, network switch 104 is configured to store a re-authentication interval value. The re-authentication interval value may be chosen to be small enough that an authorized network element will not be denied access to network resources for a significant period of time after the network element's MAC address is added to the AAA server. The re-authentication interval value may be chosen to be large enough that a network switch does not need to query the AAA server so often that network traffic is unduly increased. The re-authentication interval value may be a configurable global parameter.

In block 504, a re-authentication timer is started. For example, network switch 104 may start a re-authentication timer. In block 506, the process waits until the re-authentication timer expires. The re-authentication timer expires when the re-authentication timer value is greater than or equal to the re-authentication interval value.

In block 508, the process that is illustrated in blocks 510-518 is performed for each MAC address in a MAC address table (e.g., MAC address table 108A). For example, network switch 104 may perform the process that is illustrated in blocks 510-518 for each MAC address in MAC address table 108A.

In block 510, a server is asked whether the MAC address is authorized. For example, network switch 104 may ask AAA server 118 whether the MAC address is authorized.

In block 512, an indication is received, in response, from the server. The indication indicates whether the MAC address is authorized. For example, network switch 104 may receive, in response to asking AAA server 118 whether the MAC address is authorized, an indication from the AAA server as to whether the MAC address is authorized.

In block 514, based on the indication that was received from the server, it is determined whether the MAC address is authorized. For example, network switch 104 may determine, from an indication that was received from AAA server 118, whether the MAC address is authorized. If the MAC address is authorized, then control passes to block 516. If the MAC address is not authorized, then control passes to block 518.

In block 516, an action that is associated, in the MAC address table, with the MAC address is updated to "PERMIT". For example, network switch 104 may update an action that is associated with the MAC address in MAC address table 108A to "PERMIT".

In block 518, an action that is associated, in the MAC address table, with the MAC address is updated to "DENY". For example, network switch 104 may update an action that is associated with the MAC address in MAC address table 108A to "DENY".

The process that is illustrated in blocks 510-518 may be performed for each MAC address that is stored in any MAC address table that is stored on a particular network switch. Once the process that is illustrated in blocks 510-518 has been performed for each MAC address in any MAC address table that is stored on a particular network switch, control may pass back to block 504, wherein the re-authentication timer may be restarted.

In one embodiment, when a MAC address is initially authenticated or subsequently re-authenticated, a time that the MAC address was most recently authenticated or re-authenticated (i.e., the current time) is associated with the MAC address in a MAC address table.

4.0 Implementation Mechanisms—Hardware Overview

Figure 6:
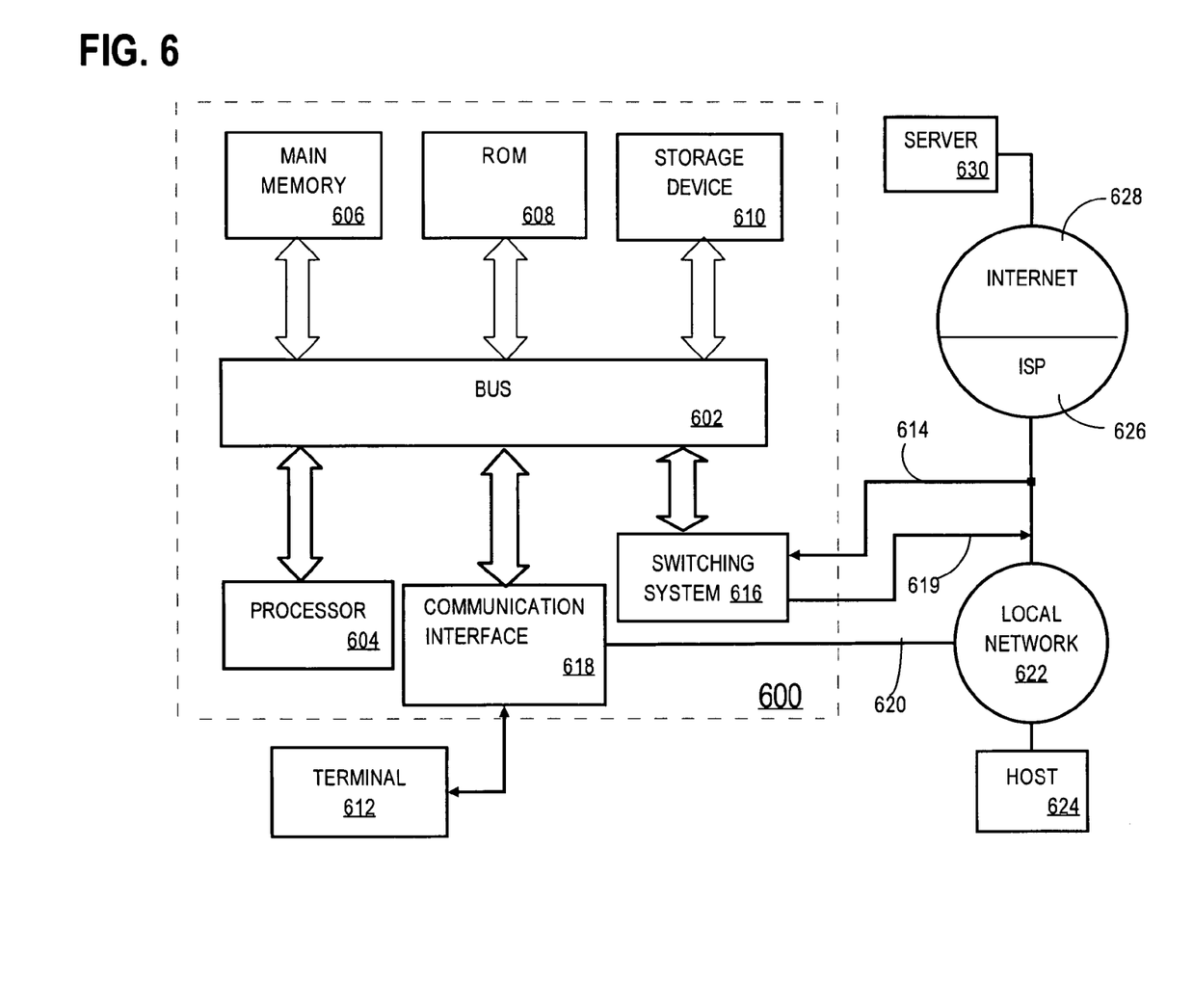
FIG. 6 is a block diagram that illustrates a computer system upon which an embodiment may be implemented.

FIG. 6 is a block diagram that illustrates a computer system 600 upon which an embodiment may be implemented. The preferred embodiment is implemented using one or more computer programs running on a network element such as a router device. Thus, in this embodiment, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 614. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for authenticating multiple network elements that access a network through a single network switch port. According to one embodiment, authentication of multiple network elements that access a network through a single network switch port is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments are not limited to any specific combination of hardware circuitry and software.

The term "computer-readable medium" as used herein refers to any medium that participates in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications. All such media must be tangible to enable the instructions carried by the media to be detected by a physical mechanism that reads the instructions into a machine.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for authenticating multiple network elements that access a network through a single network switch port as described herein.

Processor 604 may execute the received code as it is received and/or stored in storage device 610, or other non-volatile storage, for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope. The specification and drawings are, accordingly, to be regarded in an illustrative rather than a restrictive sense.

For example, while some embodiments described above refer to an AAA server 118 that is separate from network switch 104, in an alternative embodiment, the functionality of AAA server 118 may be incorporated locally into network switch 104.

What is claimed is:

1. An apparatus, comprising:
   a network interface that is capable of being coupled to a data network for sending or receiving one or more packet flows therefrom;
   one or more processors;
   one or more stored sequences of instructions which, when executed by the one or more processors, cause the one or more processors to perform:
   maintaining as open a port of a network switch in conformity with an authentication protocol in response to granting to a first host access to a particular network;
   receiving a network frame on the port of the network switch from a second host that is attempting to access the particular network, wherein the network frame is not transmitted to the particular network until the network switch determines that transmission of network frames from the second host is authorized;
   while maintaining as open the port of the network switch and while permitting network frames sent from the first host received on the port to be transmitted to the particular network, the network switch determining whether the port is associated with information that is necessary for the network switch to determine locally whether the transmission of network frames from the second host is authorized, if the port is locally associated with the necessary information, then the network switch determining locally whether the transmission of network frames from the second host is authorized, if the port is not locally associated with the necessary information, then the network switch obtaining the necessary information from an authentication server, and associating the necessary information with the port, the network switch determining locally, based on information locally associated with the port, that the second host is authorized to transmit network frames to the particular network, and the network switch permitting network frames sent from the second host received on the port to be transmitted to the particular network.

2. The apparatus of claim 1, further comprising one or more stored sequences of instructions which, when executed by the one or more processors, cause the one or more processors to perform:

receiving the network frame from the second host via a wireless local area network station through which one or more hosts can transmit network frames to the port of the switch.

3. The apparatus of claim 1, further comprising one or more stored sequences of instructions which, when executed by the one or more processors, cause the one or more processors to perform:

receiving the network frame from the second host via a network hub through which one or more hosts can transmit network frames to the port of the switch.

4. The apparatus of claim 1, wherein the authentication protocol is Extensible Authentication Protocol over Ethernet (EAPoE).

5. The apparatus of claim 1,
wherein the necessary information comprises:
one or more associations within a data structure that is associated with a port of a network switch, wherein the associations comprise:
a list of hosts that have transmitted network frames to the port, wherein each of the hosts is identified by a unique identifier; and
permission information, associated with each host, that indicates whether transmission of network frames from a particular host is permitted or denied.

6. The apparatus of claim 5, wherein the unique identifier is a MAC address.

7. The apparatus of claim 5, further comprising one or more stored sequences of instructions which, when executed by the one or more processors, cause the one or more processors to perform:

determining whether the port is associated with the necessary information by
determining the unique identifier of the second host from the network frame; and
determining that the unique identifier of the second host is in the list.

8. The apparatus of claim 5, further comprising one or more stored sequences of instructions which, when executed by the one or more processors, cause the one or more processors to perform:

determining locally whether the transmission of network frames from the second host is authorized by
determining the unique identifier of the second host from the network frame;
determining from the data structure the permission information that associated with the second host.

9. The apparatus of claim 5, further comprising one or more stored sequences instructions which, when executed by the one or more processors, cause the one or more processors to perform:

obtaining the necessary information from an authentication server by determining the unique identifier of the second host from the network frame using the unique identifier, asking the authentication server whether the second host is authorized to transmit frames to the network;

receiving permission information for the second host from the authentication server; and adding an association to the data structure comprising the second host and the permission information for the second host.

10. The apparatus of claim 5, wherein the necessary information further comprises a plurality of timestamps, each timestamp associated with each host, each timestamp indicating when a network frame from a particular host was last received.

11. The apparatus of claim 10, further comprising one or more stored sequences of instructions which, when executed by the one or more processors, cause the one or more processors to perform:

when the network frame is received from the second host at the port of the switch, determining a time difference between a current time and the timestamp associated with the second host;

if the difference between the current time and the timestamp is greater than or equal to a specified time value, then removing, from the data structure, the association comprising the timestamp, the second host, and the permission information for the second host.

12. The apparatus of claim 10, further comprising one or more stored sequences of instructions which, when executed by the one or more processors, cause the one or more processors to perform:

determining whether a timer value is greater than or equal to a specified time interval; and
if the timer value is greater than or equal to a specified time interval, then:
for each host that is listed in the data structure, asking the authentication server whether the host is currently authorized to transmit frames to the particular network, receiving permission information for a particular host from the authentication server, and based on the permission information received from the authentication server, updating the permission information the particular host.

13. The apparatus of claim 10, further comprising one or more stored sequences of instructions which, when executed by the one or more processors, cause the one or more processors to perform:

determining a time difference between a current time and each of the plurality of timestamps; and
if the difference between the current time and a particular timestamp is greater than or equal to a specified time value, then removing, from the data structure, the association comprising the timestamp, the host, and the permission information for the host.

14. The apparatus of claim 13, further comprising one or more stored sequences of instructions which, when executed by the one or more processors, cause the one or more processors to perform:

determining a time difference and the removing at regular intervals, wherein the interval is a specified time value, and further comprising instructions which when executed cause performing the determining a time difference and the removing when a timer value is greater than or equal to the interval.

15. A method implemented in a network switch comprising one or more processors, memory, and a port, the method comprising:

maintaining as open the port of the network switch in conformity with an authentication protocol in response to granting to a first host access to a particular network;

receiving a network frame on the port of the network switch from a second host that is attempting to access the particular network, wherein the network frame is not transmitted to the particular network until the network switch determines that transmission of network frames from the second host is authorized;

while maintaining as open the port of the network switch and while permitting network frames sent from the first host received on the port to be transmitted to the particular network, the network switch determining whether the port is associated with information that is necessary for the network switch to determine locally whether the transmission of network frames from the second host is authorized, if the port is locally associated with the necessary information, then the network switch determining locally whether the transmission of network frames from the second host is authorized, if the port is not locally associated with the necessary information, then the network switch obtaining the necessary information from an authentication server, and associating the necessary information with the port, the network switch determining locally, based on information locally associated with the port, that the second host is authorized to transmit network frames to the particular network, and the network switch permitting network frames sent from the second host received on the port to be transmitted to the particular network.

16. The method of claim 15, wherein receiving the network frame from the second host includes receiving the network frame via a wireless local area network station through which one or more hosts can transmit network frames to the port of the switch.

17. The method of claim 15, wherein receiving the network frame from the second host includes receiving the network frame from the network host via a network hub through which one or more hosts can transmit network frames to the port of the switch.

18. The method of claim 15, wherein the authentication protocol is Extensible Authentication Protocol over Ethernet (EAPoE).

19. The method of claim 15, wherein the necessary information comprises:

one or more associations within a data structure that is associated with a port of a network switch, wherein the associations comprise a list of hosts that have transmitted network frames to the port, wherein each of the hosts is identified by a unique identifier; and permission information, associated with each host, that indicates whether transmission of network frames from a particular host is permitted or denied.

20. The method of claim 19, wherein the unique identifier is a MAC address.

21. The method of claim 19, wherein determining whether the port is associated with the necessary information comprises:

determining the unique identifier of the second host from the network frame; and determining that the unique identifier of the second host is in the list.

22. The method of claim 19, wherein determining locally whether the transmission of network frames from the second host is authorized comprises:

determining the unique identifier of the second host from the network frame;

determining from the data structure the permission information that associated with the second host.

23. The method of claim 19, wherein obtaining the necessary information from an authentication server comprises:

determining the unique identifier of the second host from the network frame asking the authentication server, using the unique identifier, whether the second host is authorized to transmit frames to the network;

receiving permission information for the second host from the authentication server; and adding an association to the data structure comprising the second host and the permission information for the second host.

24. The method of claim 19, wherein the necessary information comprises further comprises a plurality of timestamps, each timestamp associated with each host, each timestamp indicating when a network frame from a particular host was last received.

25. The method of claim 24, further comprising:

determining whether a timer value is greater than or equal to a specified time interval; and asking the authentication server whether the host is currently authorized to transmit frames to the particular network for receiving permission information for a particular host from the authentication server, and for updating the permission information the particular host based on the permission information received from the authentication server, for each host that is listed in the data structure.

26. The method of claim 24, further comprising:

determining a time difference between a current time and each of the plurality of timestamps; and removing, from the data structure, the association comprising the timestamp, the host, and the permission information for the host, if the difference between the current time and a particular timestamp is greater than or equal to a specified time value.

27. A non-transitory computer-readable medium storing instructions for:

maintaining as open a port of a network switch in conformity with an authentication protocol in response to granting to a first host access to a particular network;

receiving a network frame on the port of the network switch from a second host that is attempting to access the particular network, wherein the network frame is not transmitted to the particular network until the network switch determines that transmission of network frames from the second host is authorized;

while maintaining as open the port of the network switch and while permitting network frames sent from the first host received on the port to be transmitted to the particular network, the network switch determining whether the port is associated with information that is necessary for the network switch to determine locally whether the transmission of network frames from the second host is authorized, if the port is locally associated with the necessary information, then the network switch determining locally whether the transmission of network frames from the second host is authorized, if the port is not locally associated with the necessary information, then the network switch obtaining the necessary information from an authentication server, and associating the necessary information with the port, the network switch determining locally, based on information locally associated with the port, that the second host is authorized to transmit network frames to the particular network, and the network switch permitting network frames sent from the second host received on the port to be transmitted to the particular network.

28. The non-transitory computer-readable medium of claim 27, further storing instructions for:
receiving the network frame from the second host via a wireless local area network station through which one or more hosts can transmit network frames to the port of the switch.

29. The non-transitory computer-readable medium of claim 27, further storing instructions for:
receiving the network frame from the second host via a network hub through which one or more hosts can transmit network frames to the port of the switch.

30. The non-transitory computer-readable medium of claim 27, wherein the authentication protocol is Extensible Authentication Protocol over Ethernet (EAPoE).

31. The non-transitory computer-readable medium of claim 27,
wherein the necessary information comprises:
one or more associations within a data structure that is associated with a port of a network switch, wherein the associations comprise:
a list of hosts that have transmitted network frames to the port, wherein each of the hosts is identified by a unique identifier; and
permission information, associated with each host, that indicates whether transmission of network frames from a particular host is permitted or denied.

32. The non-transitory computer-readable medium of claim 31, wherein the unique identifier is a MAC address.

33. The non-transitory computer-readable medium of claim 31, further storing instructions for:
determining whether the port is associated with the necessary information by determining the unique identifier of the second host from the network frame; and
determining that the unique identifier of the second host is in the list.

34. The non-transitory computer-readable medium of claim 31, further storing instructions for:
determining locally whether the transmission of network frames from the second host is authorized by
determining the unique identifier of the second host from the network frame;
determining from the data structure the permission information that associated with the second host.

35. The non-transitory computer-readable medium of claim 31, further storing instructions for:
obtaining the necessary information from an authentication server by determining the unique identifier of the second host from the network frame using the unique identifier, asking the authentication server whether the second host is authorized to transmit frames to the network;
receiving permission information for the second host from the authentication server; and
adding an association to the data structure comprising the second host and the permission information for the second host.

36. The non-transitory computer-readable medium of claim 31, wherein the necessary information further comprises a plurality of timestamps, each timestamp associated with each host, each timestamp indicating when a network frame from a particular host was last received.

37. The non-transitory computer-readable medium of claim 36, further storing instructions for:
when the network frame is received from the second host at the port of the switch, determining a time difference between a current time and the timestamp associated with the second host;
if the difference between the current time and the timestamp is greater than or equal to a specified time value, then removing, from the data structure, the association comprising the timestamp, the second host, and the permission information for the second host.

38. The non-transitory computer-readable medium of claim 36, further storing instructions for:
determining whether a timer value is greater than or equal to a specified time interval; and
if the timer value is greater than or equal to a specified time interval, then:
for each host that is listed in the data structure, asking the authentication server whether the host is currently authorized to transmit frames to the particular network, receiving permission information for a particular host from the authentication server, and based on the permission information received from the authentication server, updating the permission information the particular host.

39. The non-transitory computer-readable medium of claim 36, further storing instructions for:
determining a time difference between a current time and each of the plurality of timestamps; and
if the difference between the current time and a particular timestamp is greater than or equal to a specified time value, then removing, from the data structure, the association comprising the timestamp, the host, and the permission information for the host.

40. The non-transitory computer-readable storage medium of claim 39, further storing instructions for:
performing the determining a time difference and the removing at regular intervals, wherein the interval is a specified time value; and
performing the determining a time difference and the removing when a timer value is greater than or equal to the interval.

* * * * *

UNITED STATES PATENT AND TRADEMARK OFFICE
CERTIFICATE OF CORRECTION

| | | |
|---|---|---|
| PATENT NO. | : 7,962,954 B2 | |
| APPLICATION NO. | : 11/962069 | |
| DATED | : June 14, 2011 | |
| INVENTOR(S) | : Arthur Zavalkovsky et al. | |

It is certified that error appears in the above-identified patent and that said Letters Patent is hereby corrected as shown below:

COLUMN 14

Claim 1: Line 63: after "is authorized;" please insert --and--.

Signed and Sealed this
Nineteenth Day of July, 2011

David J. Kappos
*Director of the United States Patent and Trademark Office*